(12) United States Patent
Daniel

(10) Patent No.: US 6,883,854 B2
(45) Date of Patent: Apr. 26, 2005

(54) STOWABLE REAR SEAT FOR VEHICLE PASSENGER COMPARTMENTS

(75) Inventor: Patrick Daniel, Luzarches (FR)

(73) Assignee: Faurecia Automotive Seating Canada Limited, Mississauga (CA)

( * ) Notice: Subject to any disclaimer, the term of this patent is extended or adjusted under 35 U.S.C. 154(b) by 0 days.

(21) Appl. No.: 10/749,509

(22) Filed: Jan. 2, 2004

(65) Prior Publication Data

US 2004/0183328 A1 Sep. 23, 2004

Related U.S. Application Data

(60) Provisional application No. 60/437,987, filed on Jan. 6, 2003.

(51) Int. Cl.$^7$ ................................................. B60N 2/04
(52) U.S. Cl. ...................... 296/65.03; 297/14; 297/15; 297/334; 297/335
(58) Field of Search .......................... 296/65.03, 65.09; 297/14, 15, 325, 331, 332, 333, 334, 335, 336

(56) References Cited

U.S. PATENT DOCUMENTS

| | | | | |
|---|---|---|---|---|
| 3,011,581 A | * | 12/1961 | Wood ........................ | 180/89.18 |
| 4,484,776 A | | 11/1984 | Gokimoto et al. ........ | 296/65.09 |
| 4,527,828 A | * | 7/1985 | Groce et al. .............. | 296/65.09 |
| 4,700,989 A | | 10/1987 | Ercilla ........................ | 297/331 |
| 4,773,693 A | | 9/1988 | Premji et al. ............. | 296/65.03 |
| 4,993,666 A | * | 2/1991 | Baymak et al. .......... | 244/122 R |
| 5,482,349 A | | 1/1996 | Richter et al. ................. | 297/15 |
| 5,498,051 A | | 3/1996 | Sponsler et al. .......... | 296/65.03 |
| 5,498,052 A | * | 3/1996 | Severini et al. ........... | 296/65.09 |
| 5,626,391 A | | 5/1997 | Miller et al. ................. | 297/331 |
| 5,671,948 A | * | 9/1997 | Susko et al. .............. | 280/801.1 |
| 6,012,771 A | * | 1/2000 | Shea ........................ | 297/216.1 |
| 6,135,555 A | | 10/2000 | Liu et al. ..................... | 297/336 |
| 6,231,103 B1 | * | 5/2001 | Elson et al. .............. | 296/65.06 |
| 6,742,841 B1 | * | 6/2004 | Soditch et al. ............. | 297/335 |
| 2001/0052718 A1 | * | 12/2001 | Sugiura et al. ............... | 297/15 |
| 2004/0183328 A1 | * | 9/2004 | Daniel ..................... | 296/65.03 |

* cited by examiner

*Primary Examiner*—D. Glenn Dayoan
*Assistant Examiner*—Paul Chenevert
(74) *Attorney, Agent, or Firm*—Patrick J. Hofbauer

(57) ABSTRACT

A stowable vehicle seat assembly for use in a vehicle cabin having a cabin floor. The seat assembly includes a seat cushion member having downwardly extending front and rear legs. A mounting means is positioned on the front and rear legs for releasable engagement with the cabin floor. A control rod system is pivotably interconnected between the seat cushion member and the cabin floor, and is adapted to enable selective pivoting of said seat cushion member between a deployed design configuration and a raised stowed configuration. In the deployed design configuration, the mounting means is in engagement with the cabin floor as aforesaid, and the seat cushion member has a substantially horizontal orientation. The raised stowed configuration is located rearwardly of the deployed design configuration, whereat the mounting means is released from engagement with the cabin floor, with the seat cushion member has a substantially vertical orientation.

17 Claims, 8 Drawing Sheets

STOWABLE REAR SEAT FOR VEHICLE PASSENGER COMPARTMENTS

This application claims the benefit of U.S. provisional No. 60/437,987 filed Jan. 6, 2003.

FIELD OF THE INVENTION

The present invention relates to the field of stowable vehicle seats, and more particularly to a stowable rear seat for passenger compartments in pick-up trucks and the like.

BACKGROUND OF THE INVENTION

Modern pick-up trucks and similar vehicles commonly have a second or subsequent row of one or more seats positioned rearwardly of the driver's seat. Such second or subsequent rows of seats are commonly movable so as to provide an increased cargo area in the vehicle's passenger compartment or "cabin". Such second and subsequent rows of seats are hereinafter referred to alternately as "second row seats" and/or as "second row seat assemblies".

Second and subsequent row seats for pick-up trucks and similar vehicles are typically of the general type having a seat portion and a backrest portion. In the prior art, such second and subsequent row seats have been provided with an in-use or deployed design configuration, whereat the seat portion thereof is substantially horizontal and either touches or is in very close relationship with the rear wall of the vehicle's cabin, and have been rearward pivotable therefrom towards a raised stowed configuration, whereat the seat portion is substantially vertical and substantially adjacent to the cabin rear wall. One shortcoming with such second row seat designs according to the prior art, however, is that thus far, in the deployed design configuration, they have been insufficiently spaced from the rear wall of the cabin to allow for sufficient angular adjustment of their respective backrest portions. As such, second row seat passengers in pick-up trucks and the like have heretofore been faced with the prospect of riding in significant discomfort in a seat with a backrest oriented substantially upright.

Manufacturers of mini-vans and sport utility vehicles have previously provided second and subsequent rows of seats that are spaced from the rear wall of the passenger compartment, whilst also being pivotally movable between a deployed design configuration and a raised stowed configuration. U.S. Pat. No. 4,700,989 (Ercilla) discloses a vehicle seat assembly that is forwardly pivotable from a deployed design configuration towards a raised stowed configuration. In the deployed design configuration, the legs of the Ercilla vehicle seat assembly are locked to fixed attachment rods supported by the vehicle floor. The front legs of the seat disclosed by Ercilla include a blocking mechanism that prevents unlocking of the front locking means when the vehicle seat assembly is in its deployed design configuration. In order to pivot the vehicle seat assembly from its deployed design configuration to its raised stowed configuration, a locking means at the rear legs is released, and then the vehicle seat assembly is pivoted forwardly to the raised stowed configuration. Ordinarily, the front locking means remains engaged, but it may be separately released when the seat is in the raised stowed configuration, if the Ercilla vehicle seat assembly is to be entirely removed from the vehicle.

A common problem associated with all seats of the general type having a raised stowed configuration that is located forwardly of the deployed design configuration, however, is that any increased cargo space provided in the passenger compartment of the vehicle when such a seat assembly is in its raised stowed configuration is not easily accessible other than by way of a rearward-facing door or hatchback. That is, users attempting to load or unload cargo from such vehicles through side-facing doors will usually encounter significant difficulties, especially insofar as any second row seats positioned in the raised stowed configuration may present a serious obstacle to such effort by partial occlusion of said side-facing doors. It will, of course, be appreciated that most pick-up trucks are not provided with rearward-facing doors or hatchbacks. As such, and because any cargo to be carried in the cabs of pick-up trucks must therefore be loaded or unloaded through the vehicle's side-facing doors, forwardly pivoting stowable second row seats have not been particularly useful in this context.

Over and above any of the aforesaid difficulties that may be encountered in adapting seat assemblies disclosed by Ercilla for a particular use as second row seats in the cabs of pick-up trucks and the like, it is also to be noted that the Ercilla patent fails to disclose any means for supporting the vehicle seat assembly in its raised stowed configuration. However, while the Ercilla patent does not itself disclose a means for preventing unexpected movement of the seat assembly towards the deployed design configuration during acceleration of the vehicle so as to thereby avoid damage to any cargo stored therewithin, the production version of this device actually uses a strap connected between the seat portion and the mini-van roof for this purpose. The strap provided in the production version of this device, however, is quite awkward to employ and aesthetically unpleasing, whilst also potentially posing a serious safety problem in crash-like situations, where the loading on such a strap can be unusually high. Moreover, it should also be appreciated that strap arrangements permit an inherent degree of pivotal movement of the raised stowed seat in at least one direction, which movement results in unacceptable movement, squeaks, rattles and other noise during travel of the vehicle over rough terrain or other surfaces. Thus, among other things, it will be seen to be desirable to rigidly secure a second row vehicle seat assembly in the raised stowed configuration in a manner which prevents any significant amount of motion of the second row vehicle seat assembly in this position. Moreover, it is desirable that a second row vehicle seat assembly be rigidly securable in a manner which is easy and convenient to use.

It is, therefore, one object of the present invention to provide a second row vehicle seat assembly that is pivotally movable between a deployed design configuration and a raised stowed configuration.

It is a further object of the present invention to provide a second row vehicle seat assembly which, in the raised stowed configuration, is positioned substantially adjacent to the rear wall of the vehicle's cabin.

It is another object of the present invention to provide a second row vehicle seat assembly that provides a stowed configuration which maximizes cargo space forwardly of the vehicle seat assembly.

It is yet another object of the present invention to provide a second row vehicle seat assembly that, in its deployed design configuration, is sufficiently spaced from the rear wall of the cabin so as to provide significant additional cargo volume therebetween and so as to provide ample space therebetween to adjust the inclination angle of the seat's backrest portion to comfortably accommodate a seat occupant or user.

It is a still further object of the present invention to provide a second row vehicle seat assembly having a seat cushion member that is selectively releasable from secure engagement with an interior floor of the cabin only when the seat assembly is in an unoccupiable fold-flat configuration.

It is a yet still further object of the present invention to provide a second row vehicle seat assembly that has a floor release mechanism that is convenient to reach and use in the unoccupiable fold-flat configuration.

It is still another object of the present invention to provide a second row vehicle seat assembly that may be locked in the raised stowed configuration, such that the raised stowed seat assembly is rigidly secured against pivotal movement upon forward and rearward acceleration or deceleration of the vehicle in which it is installed.

It is a further object of the present invention to provide a second row vehicle seat assembly that may be easily and conveniently locked in the raised stowed configuration.

SUMMARY OF THE INVENTION

In accordance with the present invention there is disclosed a stowable vehicle seat assembly for use in a vehicle cabin having a cabin floor. The seat assembly comprises a seat cushion member having one or more downwardly extending front legs, and one or more downwardly extending rear legs. The seat assembly also comprises a mounting means positioned on the front legs and on the rear legs for releasable engagement with the cabin floor. The seat assembly further comprises a control rod system pivotably interconnected between the seat cushion member and the cabin floor. The control rod system is adapted to enable selective pivoting of the seat cushion member between a deployed design configuration whereat the mounting means is in engagement with the cabin floor as aforesaid, and whereat the seat cushion member has a substantially horizontal orientation; and a raised stowed configuration located substantially rearwardly of the deployed design configuration, and whereat the mounting means is released from the engagement with the cabin floor, with the seat cushion member having a substantially vertical orientation.

In accordance with another aspect of the present invention, in the deployed design configuration, the seat cushion member is in substantially spaced relation with a rear wall of the vehicle cabin. In the raised stowed configuration, the seat cushion member is in substantially adjacent parallel relation with the rear wall.

In accordance with a further aspect of the present invention, the seat assembly further comprises a backrest member pivotally mounted on the seat cushion member for pivotal folding of the backrest member relative to the seat cushion member. In the deployed design configuration, the backrest member also has a substantially vertical orientation and is in substantially spaced relation from the rear wall. In the raised stowed configuration, the backrest member has the substantially vertical orientation and is substantially interposed between the seat cushion member and the rear wall.

In accordance with still another aspect of the present invention, the backrest member is selectively forwardly foldable over the seat cushion member from the deployed design configuration towards a fold-flat configuration intermediate of the deployed design configuration and the raised stowed configuration. The backrest member has a substantially horizontal orientation and is in substantially parallel juxtaposed relation with the seat cushion member in the fold-flat configuration.

In accordance with a still further aspect of the present invention, the mounting means comprises leg locking means for selectively releasing the mounting means from the engagement with the cabin floor when the backrest member is in the fold-flat configuration.

In accordance with still yet another aspect of the present invention, the seat assembly further comprises backrest locking means for locking the backrest member in substantially parallel juxtaposed relation with the seat cushion member when the mounting means is released from the engagement with the cabin floor as aforesaid.

In accordance with a still yet further aspect of the present invention, the seat assembly further comprises seat biasing means for biasing the seat cushion member towards the raised stowed configuration.

In accordance with another aspect of the present invention, the control rod system comprises a forward control rod and a rearward control rod. The forward control rod and the rearward control rod are each pivotably interconnected between the cabin floor and the seat cushion member. As such, the forward control rod, the rearward control rod, the cabin floor and the seat cushion member together define a notional quadrilateral having four pivotal corners.

In accordance with a further aspect of the present invention, the seat assembly further comprises a stowed latching means for releasably securing the vehicle seat assembly in the raised stowed configuration.

Other objectives, advantages, characteristics and features of the present invention, as well as methods of operation and functions of the related elements of the structure, and the combination of parts and economies of manufacture, will become more apparent upon consideration of the following drawings and detailed description, and the appended claims.

BRIEF DESCRIPTION OF THE DRAWINGS

The following drawings illustrate by way of example a presently preferred embodiment according to the invention. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
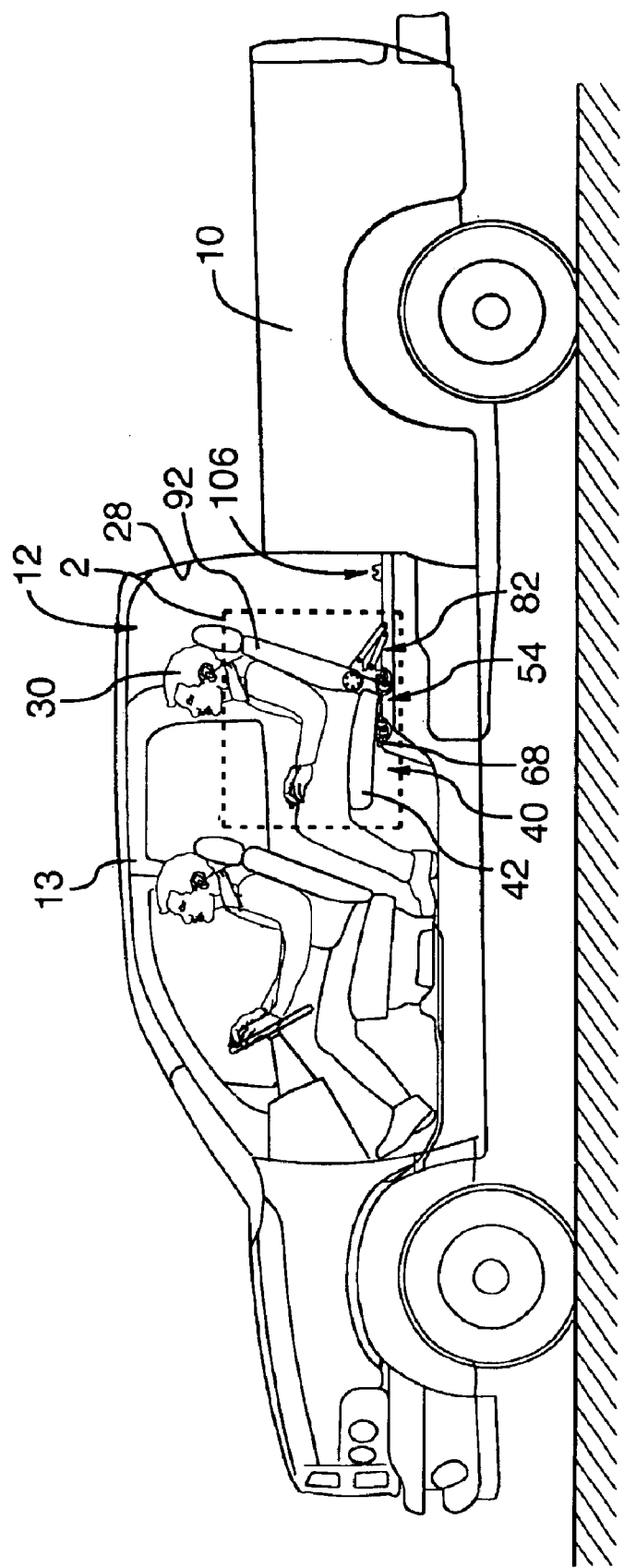
FIG. 1 is a left side elevational view of a stowable vehicle seat assembly according to the invention, shown in use by a seat occupant in a deployed design configuration inside a vehicle cabin, which vehicle cabin has been cut-away for ease of illustration.

Referring now to FIGS. 1 through 5 of the drawings, there is shown a stowable vehicle seat assembly 40 according to the invention. As best seen in FIG. 1, the seat assembly 40 is particularly adapted for use in a vehicle 10 having a vehicle cabin 12 such as may be found, for example, in a pick-up truck. It should be noted, however, that although FIG. 1 depicts the seat assembly 40 in use as a second row seat in a pick-up truck, the present invention is not so limited. In fact, the seat assembly 40 of the present invention may also be advantageously used in a second or subsequent row in mini-vans, sport utility vehicles, or in any other vehicle in which it is desirable to provide a cargo space within the vehicle cabin 12 that is easily accessible through a side-facing door 13.

With specific reference to a preferred embodiment of the invention that is depicted in FIGS. 1 through 5, it will be appreciated that the seat assembly 40 is of the general type having a backrest member 92 pivotally mounted on a seat cushion member 42 for pivotal folding of the backrest member 92 relative to the seat cushion member 42. As best seen in FIG. 1, cushioning and upholstery is provided in a conventional manner on each of the backrest member 92 and the seat cushion member 42 to support an occupant or user 30. As best seen in FIGS. 2 through 5, wherein the cushioning and upholstery of the seat cushion member 42 are shown in partial section for simplicity of presentation, a seat frame 44 is included within the seat cushion member 42. It should perhaps be noted that, while the seat assembly 40 according to the invention is described herein in use with a cabin floor 14 of the vehicle cabin 12, neither the vehicle cabin 12 nor the cabin floor 14 form a part of the invention. Rather, they are referred to only as part of the cooperating environment in which the present invention may be found to have the greatest utility.

The seat frame 44 of the seat cushion member 42 is preferably provided with two downwardly extending front legs 46 and two downwardly extending rear legs 48. The two front legs 46 are laterally offset from one another, so as to provide a left-side front leg (as shown in each of FIGS. 1 through 5) and a right-side front leg (not shown). Likewise, the two rear legs 48 are laterally offset from one another, so as to provide a left-side rear leg (as shown in each of FIGS. 1 through 5) and a right-side rear leg (not shown). Although the right-side front and rear legs are not depicted in the accompanying figures, it will be appreciated that they are substantial mirror-images of the respective left-side counterparts that are visible in each of FIGS. 1 through 5.

Figure 2:
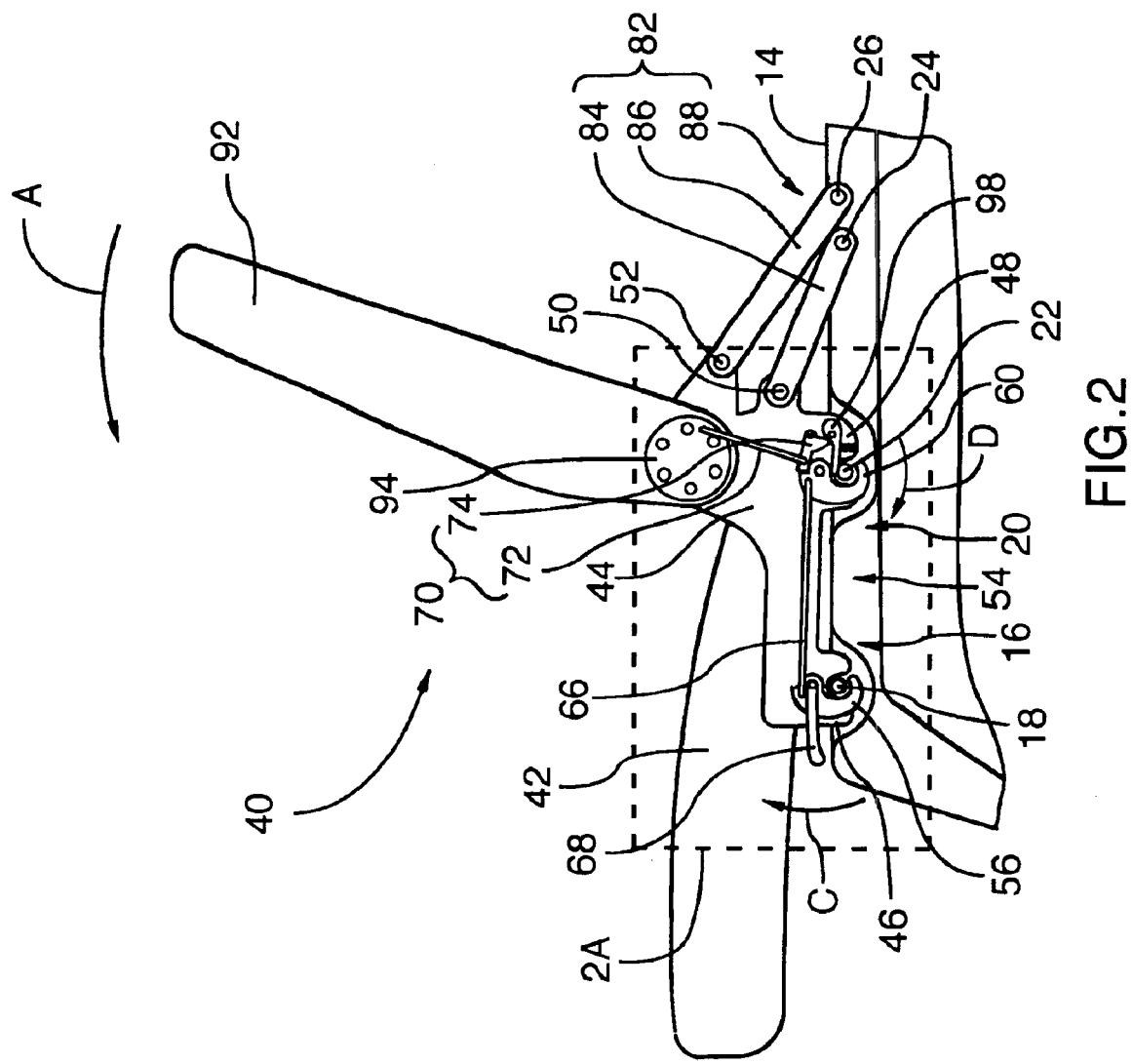
FIG. 2 is an enlarged view of the dotted area 2 of FIG. 1, with the seat occupant removed for ease of illustration.
Figure 2A:
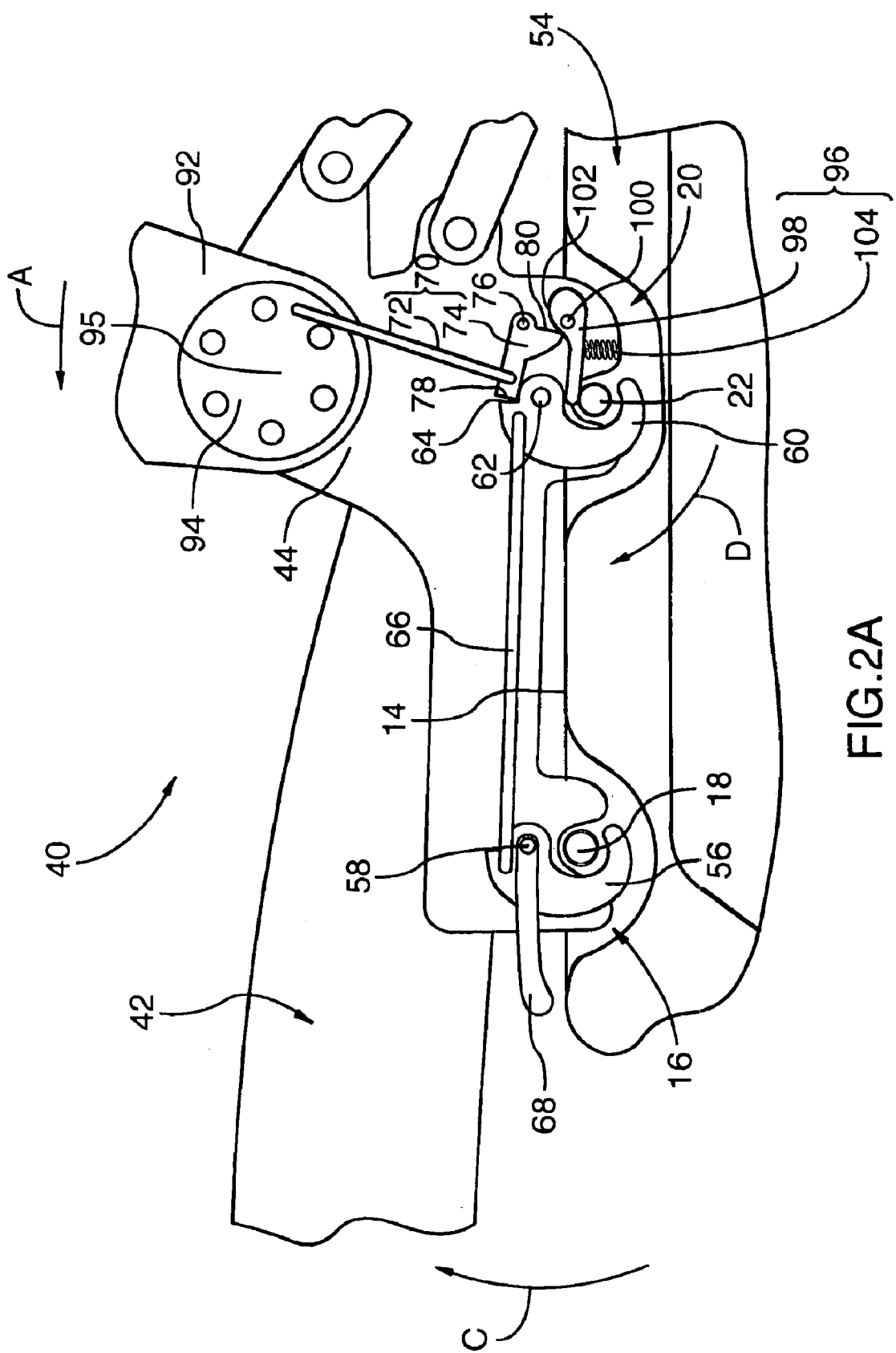
FIG. 2A is an enlarged view of the dotted area 2A of FIG. 2.
Figure 3:
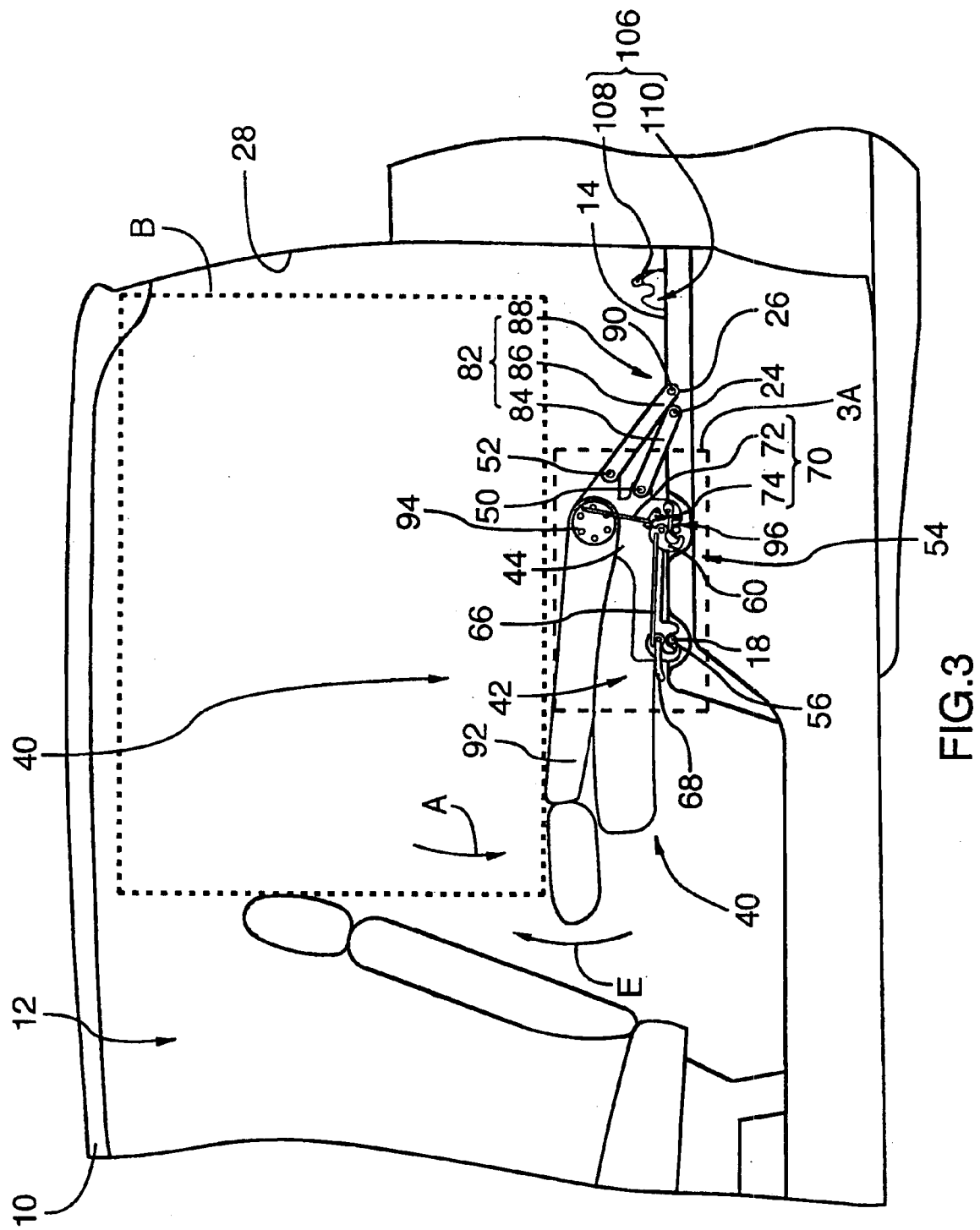
FIG. 3 is an enlarged view of the seat assembly of FIG. 1, shown in an unoccupiable fold-flat configuration with a first storage space "B" shown in dotted outline.
Figure 5:
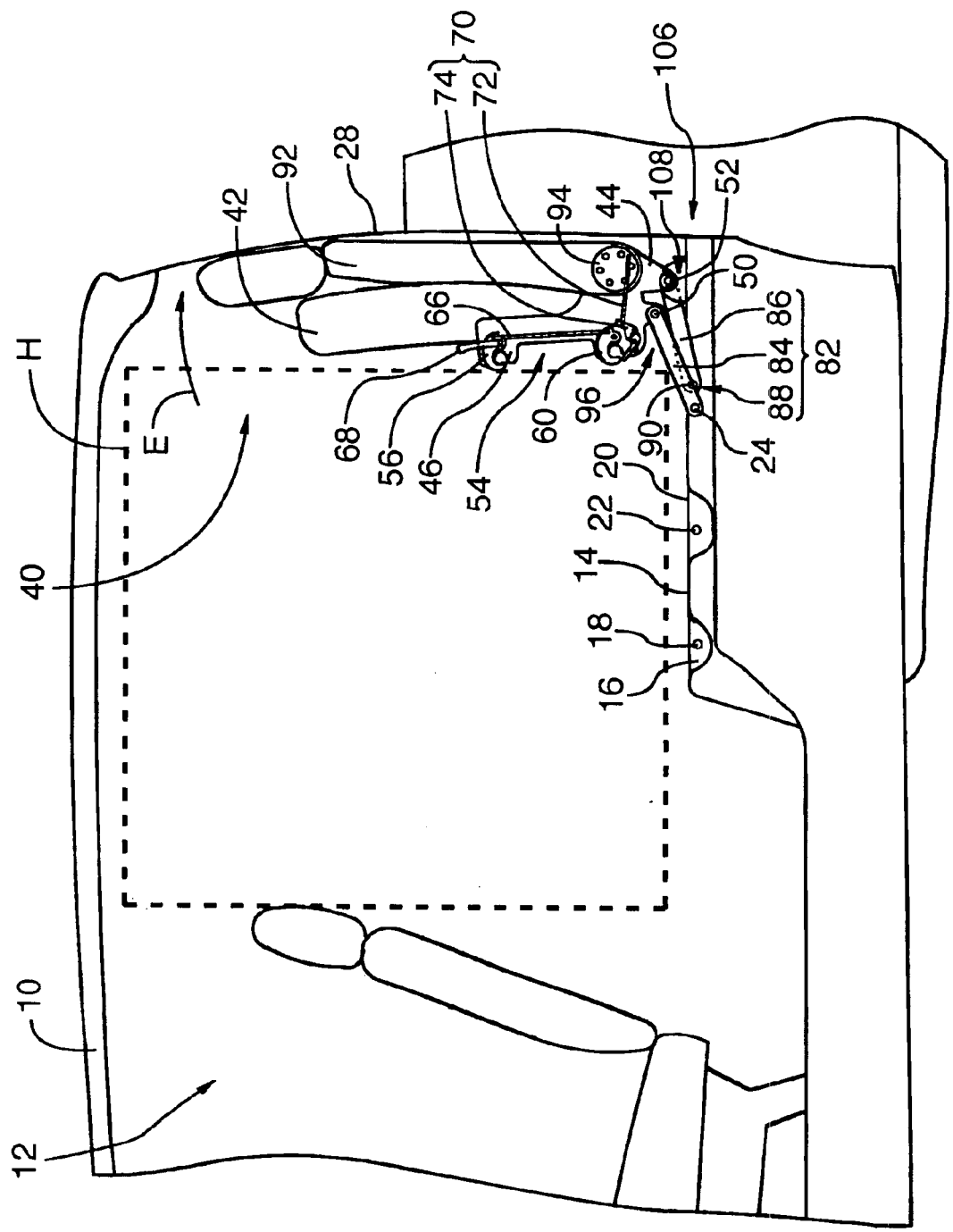
FIG. 5 is a view similar to FIG. 3, with the seat assembly shown in a raised stowed configuration with a second storage space "H" shown in dotted outline.

According to the invention, and as best seen in FIGS. 1, 3 and 5, the seat assembly 40 is provided with a control rod system 82, pivotally interconnected between the cabin floor 14 and the seat frame 44 of the seat cushion member 42, that is adapted to enable selective rearward pivoting of the seat cushion member 42 from a deployed design configuration (as shown in FIGS. 1, 2 and 2A) towards a raised stowed configuration (as shown in FIG. 5).

In the deployed design configuration shown in FIGS. 1, 2 and 2A, the seat cushion member 42 has a substantially horizontal orientation and the backrest member 92 has a substantially vertical orientation. As well, both the seat cushion member 42 and the backrest member 92 are in substantially spaced relation from a rear wall 28 of the vehicle cabin 12 in the deployed design configuration.

Conversely, in the raised stowed configuration shown in FIG. 5, both the seat cushion member 42 and the backrest member 92 have a substantially vertical orientation. As well, the seat cushion member 42 is in substantially adjacent parallel relation with the rear wall 28, and the backrest member 92 is substantially interposed between the seat cushion member 42 and the rear wall 28, in the raised stowed configuration.

According to the invention, and as best seen in FIG. 2, the seat assembly 40 is also provided with a mounting means 54 positioned on the front legs 46 and on the rear legs 48 for releasable engagement with the cabin floor 14. As best seen in FIG. 2A, the mounting means 54 includes two pivotably releasable front locking hooks 56 mounted one each on each of the front legs 46, and two pivotably releasable rear locking hooks 60 mounted one each on each of the rear legs 48. It is here noted that, although front and rear locking hooks 56, 60 are shown in the accompanying figures, it will be readily apparent to those skilled in the art that any suitable alternate mounting means (not shown) may be used according to the present invention. An example of one such alternate mounting means is the arrangement disclosed in issued U.S. Pat. No. 5,626,391 (Miller et al.) for an Uptiltable Rear Vehicle Seat Assembly, the teachings of which patent are incorporated herein by reference, with only routine modifications that are clearly within the scope of the invention disclosed herein being necessary to be made to the structure and arrangement of components of the seat assembly 40 described herein, so as to accommodate such alternate mounting means.

In the deployed design configuration of the preferred embodiment of the seat assembly 40 according to the present invention, and as best seen in FIGS. 2 and 2A, each of the front locking hooks 56 securely and releasably engages a respective front striker pin 18 that is rigidly attached, by welding or the like, to a respective front leg tub 16 defined within said cabin floor 14. As well, in the deployed design configuration, each of the rear locking hooks 60 securely and releasably engages a respective rear striker pin 22 that is likewise rigidly attached to a respective rear leg tub 20 defined within said cabin floor 14. Conversely, in the raised stowed configuration shown in FIG. 5, the locking hooks 56, 60 of the mounting means 54 are each released from their aforesaid engagement with the respective striker pins 18, 22 on the cabin floor 14.

Figure 3A:
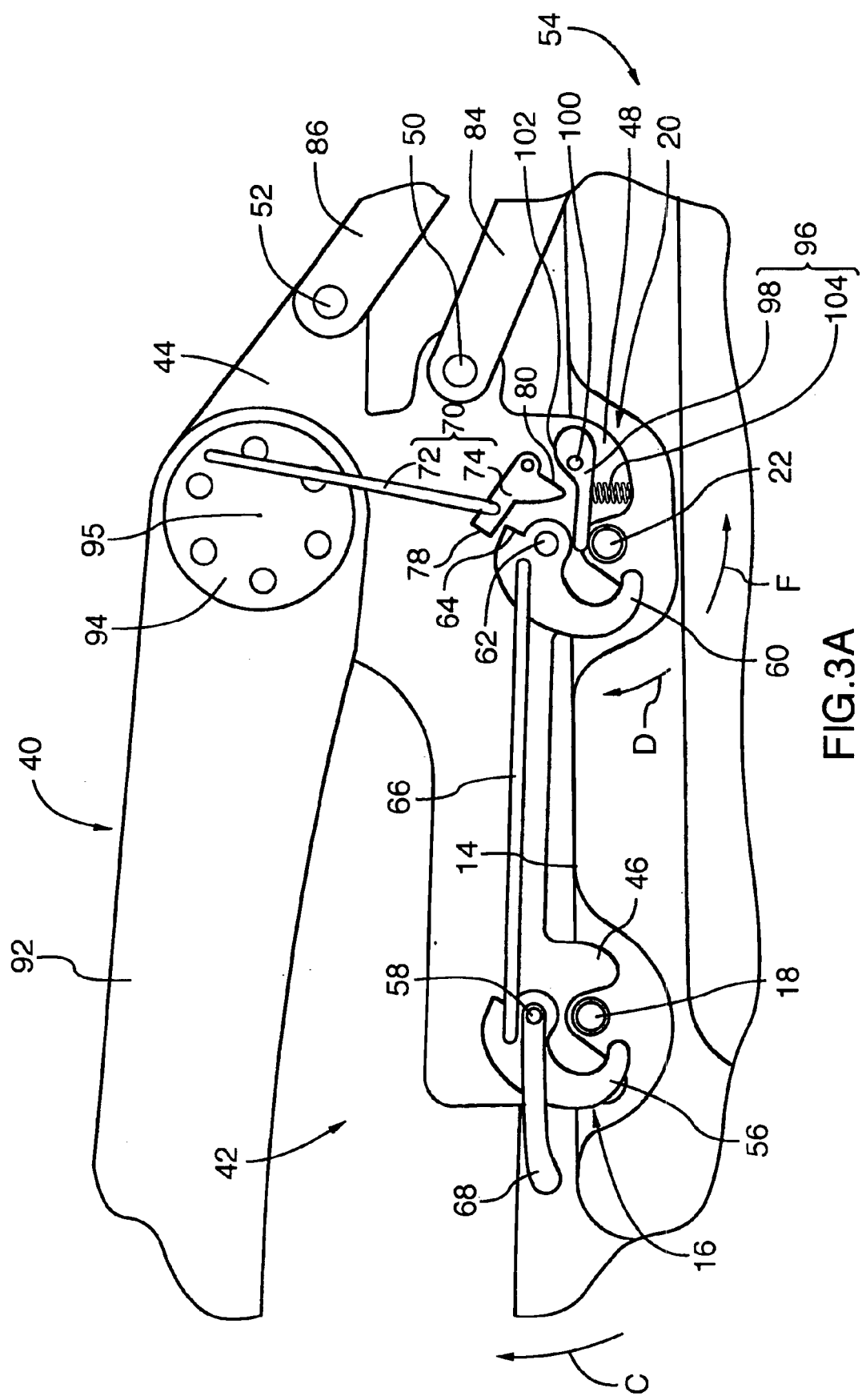
FIG. 3A is an enlarged view of the dotted area 3A of FIG. 3.

As will be best appreciated from FIGS. 2 and 3, the aforesaid secure mounting of the backrest member 92 on the seat cushion member 42 is such that the backrest member 92 is selectively foldable in a substantially forward folding direction (as generally indicated by arrow "A") over the seat cushion member 42 from the deployed design configuration (shown in FIGS. 1, 2 and 2A) towards an unoccupiable fold-flat configuration (shown in FIGS. 3 and 3A).

In the unoccupiable fold-flat configuration, the backrest member 92 has a substantially horizontal orientation and is in substantially parallel juxtaposed relation with the seat cushion member 42. The backrest member 92 is provided with any suitable backrest latching means to facilitate pivoting of the backrest member 92, in the forward folding direction "A" about a backrest pivot axis 95, over the seat cushion member 42 towards the unoccupiable fold-flat configuration. In the preferred embodiment shown in the figures, the backrest latching means is a known rotary recliner mechanism 94 that operatively and pivotably connects the backrest member 92 to the seat frame 44 in a conventional manner, and wherein the inclination angle of the backrest member 92 is easily adjustable to suit the comfort of the occupant or user 30 through manual inclination manipulation of a recliner handle (not shown). Such devices are well-known in the art and for this reason they will not be described in significant detail herein.

The unoccupiable fold-flat configuration shown in FIGS. 3 and 3A is preferably intermediate of the deployed design configuration and the raised stowed configuration (as shown in FIG. 5). To this effect, the mounting means 54 is provided with leg locking means 70 for preventing release of the mounting means 54 from the aforesaid engagement with the cabin floor 14, and for preventing rearward pivoting of the seat cushion member 42 towards the raised stowed configuration, unless the backrest member 92 is in the aforesaid parallel juxtaposed relation with the seat cushion member 42 that is reached in the unoccupiable fold-flat configuration shown in FIGS. 3 and 3A.

According to this aspect of the invention, the leg locking means 70 selectively releases the locking hooks 56, 60 of the mounting means 54 from their engagement with the respective striker pins 18, 22 on the cabin floor 14 when the backrest member 92 is in the unoccupiable fold-flat configuration. The leg locking means 70 preferably includes a backrest link member 72 pivotally connected to the rotary recliner 94 of the backrest member 92, and a hook pawl member 74 pivotally connected to the backrest link member 72. The hook pawl member 74 is pivotable about a pawl pivot pin 76 (best seen in FIG. 2A). The backrest link member 72 and the hook pawl member 74 are together adapted for positive pivoting in unison with the backrest member 92 between the deployed design configuration (best seen in FIG. 2A) and the unoccupiable fold-flat configuration (best seen in FIG. 3A).

With further reference to the mounting means 54, it will be best appreciated from FIGS. 2A and 3A that each of the front locking hooks 56 is adapted for pivoting in a substantially forward opening direction (as generally indicated by arrow "C") about a respective front hook pivot pin 58—just as each of the rear locking hooks 60 is adapted for pivoting in a substantially forward opening direction (as generally indicated by arrow "D") about a respective rear hook pivot pin 62—between a closed configuration (as shown in FIGS. 1, 2, 2A, 4, 4A and 5) and an open configuration (as shown in FIGS. 3 and 3A). The mounting means 54 is additionally provided with a hook link member 66, preferably in the form of a rod member, that is operatively and pivotally interconnected between the front locking hooks 56 and the rear locking hooks 60, so as to cause positive pivoting of the front locking hooks 56 in unison with positive pivoting of the rear locking hooks 60 during pivoting between the closed configuration and the open configuration as aforesaid.

In the deployed design configuration, and as best seen in FIG. 2A, a hook engaging surface 78 of the hook pawl member 74 engages a cam engaging surface 64 of the rear locking hooks 60 in obstructed relation so as to prevent pivoting of the rear locking hooks 60 from the closed configuration towards the open configuration. In the deployed design configuration, the hook link member 66 (operatively connected to the obstructed rear locking hooks 60) similarly prevents pivoting of the forward locking hooks 56 from the closed configuration towards the open configuration.

As such, in the unoccupiable fold-flat configuration shown in FIGS. 3 and 3A, and indeed whenever the backrest member 92 is in the aforesaid parallel juxtaposed relation with the seat cushion member 42, the hook pawl member 74 is removed from engagement with the rear locking hooks 60, and the rear locking hooks 60 are unobstructed by the hook pawl member 74, so as to enable pivoting of the rear locking hooks 60 in unison with the front locking hooks 56 from the closed configuration towards the open configuration as aforesaid.

According to the preferred embodiment of the invention illustrated, the front and rear locking hooks 56, 60 are biased in a substantially rearward closing direction (as generally indicated by arrow "F") towards the closed configuration. The rearward closing direction "F" is substantially opposed to the forward opening direction "D". Any suitable biasing means, such as, for example, a torsion spring member (not shown) mounted about each of the respective pivot pins 58 and 62, may be used to bias the front and rear locking hooks 56, 60 towards the closed configuration as aforesaid, as is well-known in the art.

As shown in FIGS. 2 through 3A, the mounting means 54 also includes a manually grippable handle means 68, operatively connected to the front locking hooks 56, for pivoting the front and rear locking hooks 56, 60 from the closed configuration (best seen in FIGS. 2 and 2A) towards the open configuration (best seen in FIG. 3A). As depicted in FIG. 1, the handle means 68 is rotatably mounted on the seat cushion member 42 about the pivot pin 58. Selective pivoting of the handle means 68 in a substantially upward handle direction (as generally indicated by arrow "C" in each of FIGS. 2, 2A and 3A) actuates the aforesaid pivoting of the front and rear locking hooks 56, 60.

Figure 4:
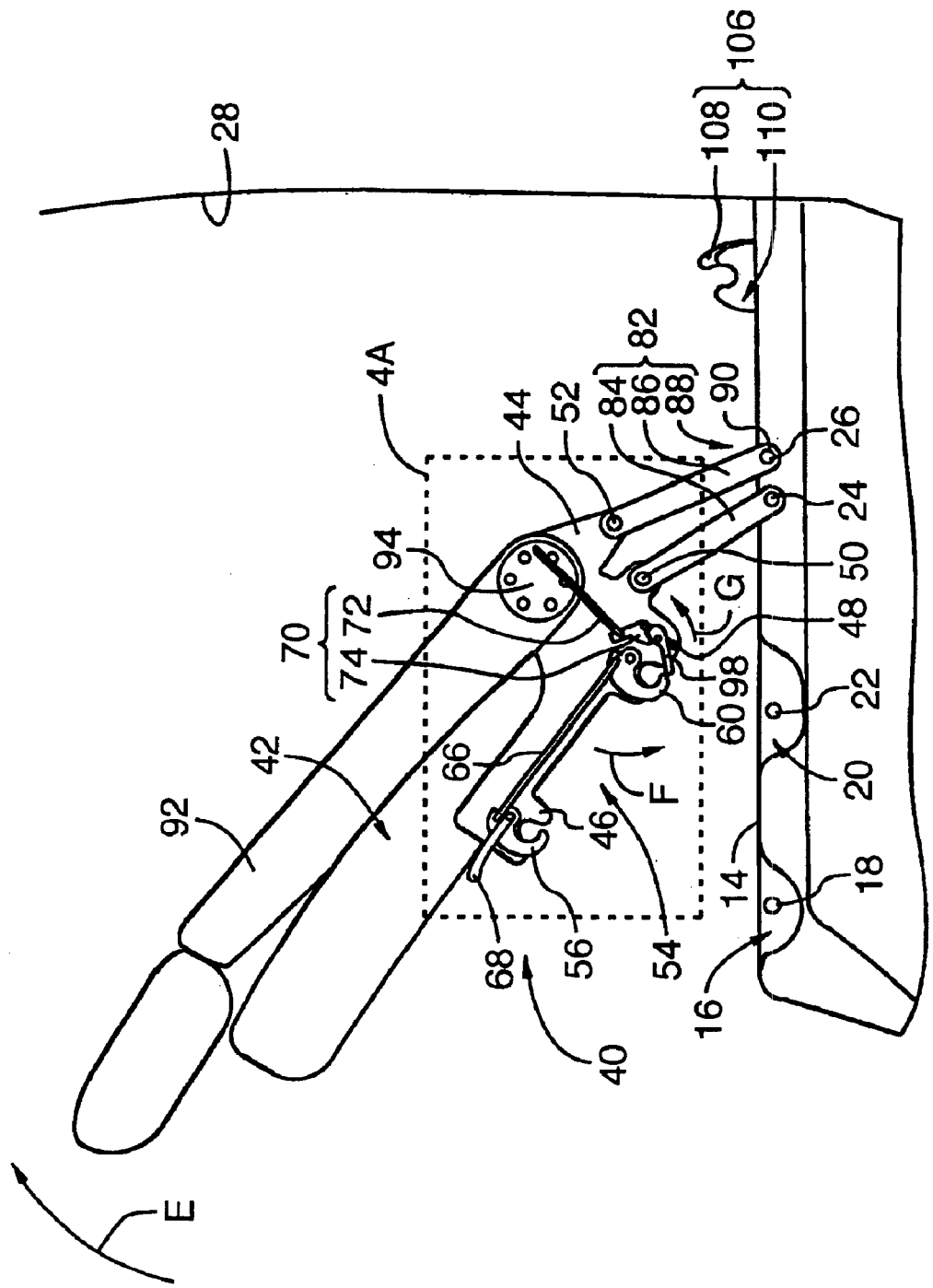
FIG. 4 is an enlarged view of the seat assembly of FIG. 1, shown in an intermediate raised configuration.
Figure 4A:
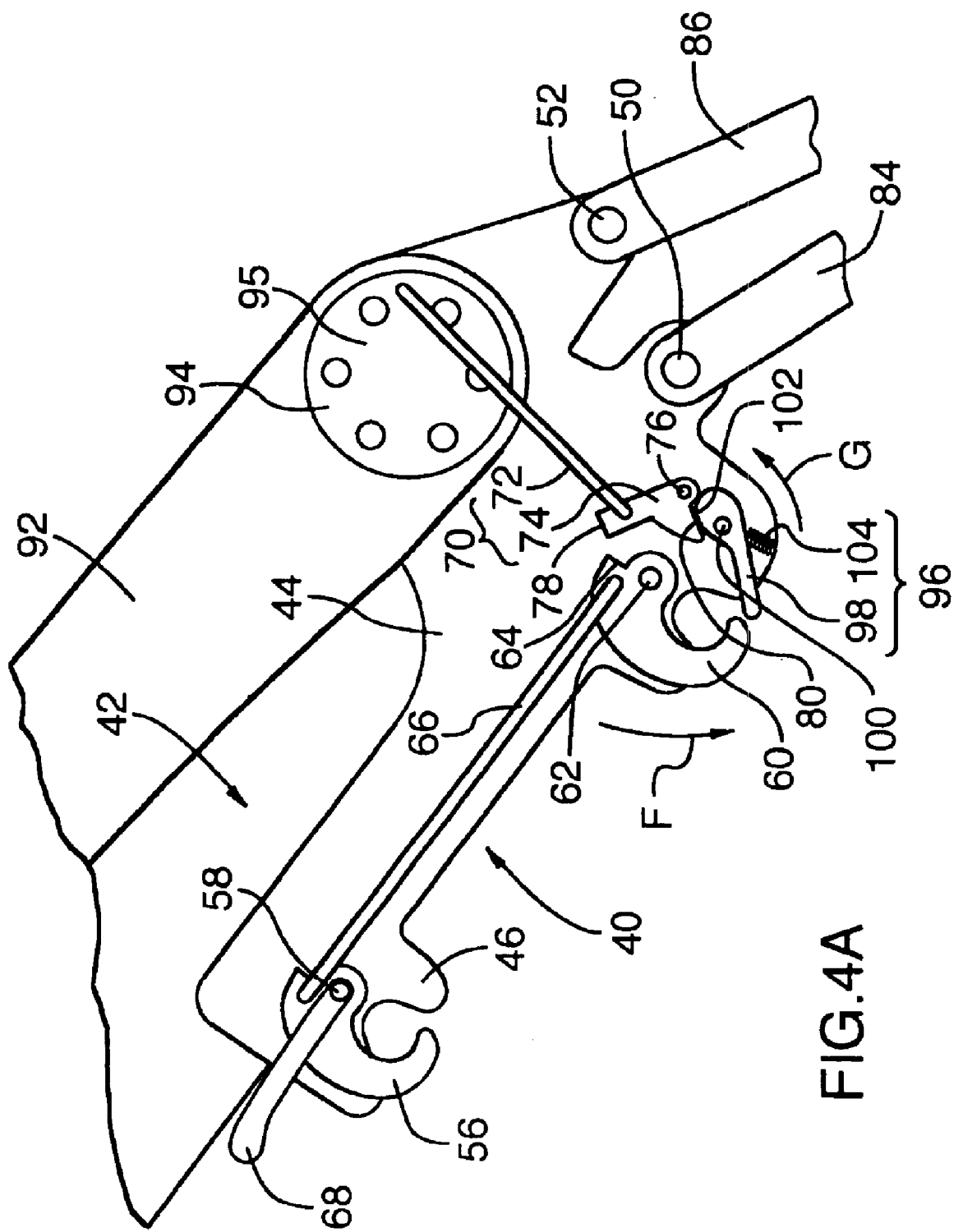
FIG. 4A is an enlarged view of the dotted area 4A of FIG. 4.

According to the preferred embodiment of the invention, and as best seen in FIG. 4A, the seat assembly 40 is further provided with backrest locking means 96 for locking the backrest member 92 in the aforesaid substantially parallel juxtaposed relation with the seat cushion member 42 when the mounting means 54 is released from its engagement with the cabin floor 14 as aforesaid. To this effect, the backrest locking means 96 selectively obstructs the hook pawl member 74, and thus the backrest member 92, from pivoting when the mounting means 54 is released from its engagement with the cabin floor 14 as aforesaid. The safety aspect of this arrangement will be readily apparent to those skilled in the art as it prevents the seat assembly 40 from being occupied whilst it is unlatched from the vehicle cabin floor 14.

According to this aspect of the invention, the backrest locking means 96 is provided with a backrest cam member 98 connected substantially adjacent to the rear legs 60 for pivotal rotation about a backrest cam pivot pin 100. The backrest locking means 96 also includes a backrest cam biasing means 104 for pivotally urging the backrest cam member 98 from a striker pin engaging position (as shown in FIGS. 1 through 3A), in a substantially upward camming direction (as generally indicated by arrow "G" in FIGS. 4 and 4A) about the backrest cam pivot pin 100, towards a backrest engaging position (as shown in FIGS. 4, 4A and 5). Preferably, the backrest cam biasing means 104 is a coil spring member interconnected between the backrest cam member 98 and an inner surface of the rear leg 48, but may take the form of any suitable biasing means.

As best seen in FIGS. 2A and 3A, wherein the mounting means 54 is depicted in engagement with the cabin floor 14 as aforesaid, the backrest cam member 98 engages the rear striker pin 22 in the striker pin engaging position. Also, the hook pawl member 74 is unobstructed by the backrest cam member 98 in the striker pin engaging position, such that it may be selectively pivoted in unison with the backrest member 92 between the deployed design configuration and the unoccupiable fold-flat configuration as aforesaid.

Conversely, and as best seen in FIG. 4A wherein the mounting means 54 is depicted as having been released from its aforesaid engagement with the cabin floor 14, in the backrest engaging position, the backrest cam member 98 is removed from its aforesaid engagement with the rear striker pin 22 into operative obstructing engagement with the hook pawl member 74, so as to lock the backrest member 92 in its aforesaid substantially parallel juxtaposed relation with the seat cushion member 42. In this regard, it will be appreciated from FIG. 4A that, when the mounting means 54 is released from its engagement with the cabin floor 14 as aforesaid, a backrest engaging surface 102 of the backrest cam member 98 engages a cam engaging surface 80 of the hook pawl member 74 in obstructed relation so as to prevent pivoting of the hook pawl member 74, thus to prevent (with the agency of the backrest link member 72) pivoting of the backrest member 92 from its aforesaid substantially parallel juxtaposed relation with the seat cushion member 42.

In the preferred embodiment shown in the figures, and as best seen in FIGS. 1, 3 and 5, the control rod system 82 is provided with a forward control rod 84 and a rearward control rod 86. The forward control rod 84 is pivotably interconnected between a forward pivot pin 24 on the cabin floor 14 and a lower pivot pin 50 on the seat frame 44. The rearward control rod 86 is pivotably interconnected between a rearward pivot pin 26 on the cabin floor 14 and an upper pivot pin 52 on the seat frame 44. As such, the forward control rod 84, the rearward control rod 86, the cabin floor 14 and said the seat frame 44 together define a notional quadrilateral having four pivotal corners 24, 26, 50 and 52. It will be readily apparent to those skilled in the art that this notional quadrilateral with its four pivotal corners 24, 26, 50 and 52 translate during movement of the seat cushion member 42 from the deployed design configuration towards the raised stowed configuration, as aforesaid, thereby causing the seat cushion member 42 to positively pivot from the substantially horizontal orientation towards the substantially vertical orientation.

In the preferred embodiment, the control rod system 82 of the seat assembly 40 is also provided with seat biasing means 88 for biasing the seat cushion member 42 towards the raised stowed configuration. Preferably, the seat biasing means 88 is a conventional torsion rod 90 pivotably interconnected between the cabin floor 14 and the rearward control rod 86 substantially adjacent to the rearward pivot pin 26.

In the preferred embodiment shown in the figures, and as best seen in FIGS. 1, 3 and 5, the seat assembly 40 may also be provided with stowed latching means 106 for releasably securing the seat assembly 40 in the raised stowed configuration (as shown in FIG. 5). Preferably, the stowed latching means 106 includes a locking hook 110 that is adapted to releasably and securely engage the upper pivot pin 52 of the seat frame 44 when the seat cushion member 42 reaches the raised stowed configuration (as best seen in FIG. 5), so as to be easily and conveniently locked in the raised stowed configuration and so as to rigidly secure the seat assembly 40 against pivotal movement upon forward and rearward acceleration or deceleration of the vehicle 10. Naturally, the stowed latching means 106 also includes a release means 10B for releasing the locking hook 110 from its aforesaid engagement with the upper pivot pin 52. Preferably, the release means 108 of the stowed latching means 106 is both hand and foot actuable, whilst also being effectively shielded from accidental or inadvertent actuation.

In use, the seat assembly 40 is initially positioned in the deployed design configuration shown in FIGS. 1 through 2A, with the mounting means 54 releasably engaging the cabin floor 14. The backrest member 92 may then be pivoted in the forward folding direction "A" over the seat cushion member 42 to reach the unoccupiable fold-flat configuration shown in FIGS. 3 and 3A, and to provide a first storage space (as generally indicated by dotted outline "B" in FIG. 3) located upwardly of the folded seat assembly 40. In the unoccupiable fold-flat configuration, the rear locking hooks 60 are unobstructed by the hook pawl member 74, so as to enable selective pivoting of the handle means 68 in the upward handle direction "C" and pivoting of the front and rear locking hooks 56, 60 in the forward opening direction "D" from the closed configuration towards the open configuration as aforesaid (and as best seen in FIG. 3A).

With the front and rear locking hooks 56, 60 in the open configuration, the seat cushion member 42 is then pivoted in a rearward stowing direction (as generally indicated by arrow "E" in FIGS. 3, 4 and 5) from the unoccupiable fold-flat configuration best seen in FIG. 3, through an intermediate raised configuration best seen in FIG. 4, towards the raised stowed configuration shown in FIG. 5. When the mounting means 54 is released from its engagement with the cabin floor 14, the front and rear locking hooks 56, 60 are biased to move in the rearward closing direction "F" from the open configuration towards the closed configuration. Additionally, when the mounting means 54 is released from its engagement with the cabin floor 14, the backrest cam member 98 is biased to move in the upward camming direction "G" from the striker pin engaging position towards the backrest engaging position, so as to prevent pivoting of the backrest member 92 from its substantially parallel juxtaposed relation with the seat cushion member 42 as aforesaid.

On reaching the raised stowed configuration shown in FIG. 5, the seat assembly 40 is releasably secured by the stowed latching means 106. The raised stowed configuration provides a second storage space (as generally indicated by dotted outline "H" in FIG. 5) located forwardly of the seat assembly 40. It will be appreciated that the seat assembly 40 according to the present invention may be released from the stowed latching means 106 and returned to the deployed design configuration by simply following the aforesaid steps in reverse.

It will be appreciated from the foregoing that the seat assembly 40 is relatively lightweight and quiet in use, and is capable of fitting into a relatively small design envelope. It also will be seen to have a simple design, with a correspondingly low economy of manufacture, assembly, and installation. Thus, the seat assembly 40 according to the present invention provides adequate strength, durability and reliability and is easy to use, with relatively little effort being required on the part of a user 30 in order to reach the raised stowed configuration. The raised stowed configuration maximizes cargo space forwardly of the seat assembly 40. As well, in its deployed design configuration, the seat assembly 40 will be appreciated to be in spaced relation from the rear wall 28 of the cabin 12 so as to provide additional cargo volume and space necessary to adjust the angle of the seat's backrest member 92 through manual inclination manipulation by the user 30 of the recliner handle (not shown) that is conventionally mounted outboard on the rotary recliner mechanism 94. It will be further appreciated from the foregoing that the seat cushion member 42 is selectively releasable from secure engagement with the cabin floor 14 of the vehicle cabin 12 only when the seat assembly 40 is in the unoccupiable fold-flat configuration. As well, the handle means 68 of the invention is convenient to reach and use in the unoccupiable fold-flat configuration.

Other modifications and alterations may be used in the design and manufacture of the seat assembly 40 according to the present invention without departing from the spirit and scope of the invention, which is limited only by the accompanying claims. For example, in the raised stowed configuration, the seat cushion member 42 may not be in substantially adjacent parallel relation with the rear wall 28. Likewise, the backrest member 92 may be entirely absent from the assembly, and, if present, need not be substantially interposed between the seat cushion member 42 and the rear wall 28 in the raised stowed configuration. Further, neither the backrest member 92 nor the seat cushion member 42 need have a fully vertical orientation in the raised stowed configuration, so long as the orientation in this configuration is more vertical than horizontal. Additionally, the unoccupiable fold-flat configuration need not be intermediate of the deployed design configuration and the raised stowed configuration, but rather folding of the backrest member 92 over the seat cushion member 42 may be progressively coincident with rearward pivoting of the seat cushion member 42 towards the raised stowed configuration. In another example of a modification that lies within the scope of the invention, the stowed latching means 106 may be other than in the form of the locking hook 110, and may instead be in the form of a secure system of straps that releasably secures the seat assembly 40 in the raised stowed configuration. Similarly, either or both of the upward handle direction "C" and the upward camming direction "G" may instead be oriented in a substantially downward direction, or otherwise. Likewise, one or more of the forward opening direction "D" and the rearward closing direction "F" may be oriented in a direction other than in a forward and rearward direction respectively. Because of the numerous exemplary modifications of the seat assembly 40 that are described above without departing from the spirit and scope of the present invention, it is perhaps worthwhile to once again note that the invention is limited only by the accompanying claims.

I claim:

1. A stowable vehicle seat assembly for use in a vehicle cabin having a cabin floor, said seat assembly comprising:
   a) a seat cushion member having one or more downwardly extending front legs, and one or more downwardly extending rear legs;
   b) a mounting means positioned on said front legs and on said rear legs for releasable engagement with said cabin floor; and
   c) a control rod system pivotably interconnected between said seat cushion member and said cabin floor, said control rod system being adapted to enable selective pivoting of said seat cushion member between:
      i) a deployed design configuration whereat said mounting means is in engagement with said cabin floor as aforesaid, and whereat said seat cushion member has a substantially horizontal orientation; and
      ii) a raised stowed configuration located substantially rearwardly of said deployed design configuration, and whereat said mounting means is released from said engagement with said cabin floor, with said seat cushion member having a substantially vertical orientation.

2. A stowable vehicle seat assembly according to claim 1, wherein:
   a) in said deployed design configuration, said seat cushion member is in substantially spaced relation with a rear wall of said vehicle cabin; and
   b) in said raised stowed configuration, said seat cushion member is in substantially adjacent parallel relation with said rear wall.

3. A stowable vehicle seat assembly according to claim 2, further comprising a backrest member pivotally mounted on said seat cushion member for pivotal folding of said backrest member relative to said seat cushion member, and wherein:
   a) in said deployed design configuration, said backrest member also has a substantially vertical orientation and is in substantially spaced relation from said rear wall; and
   b) in said raised stowed configuration, said backrest member has said substantially vertical orientation and is substantially interposed between said seat cushion member and said rear wall.

4. A vehicle seat assembly according to claim 3, wherein said backrest member is selectively forwardly foldable over the seat cushion member from said deployed design configuration towards a fold-flat configuration intermediate of said deployed design configuration and said raised stowed configuration, with said backrest member having said substantially horizontal orientation and being in substantially parallel juxtaposed relation with said seat cushion member in said fold-flat configuration.

5. A stowable vehicle seat assembly according to claim 4, wherein said mounting means comprises leg locking means for selectively releasing said mounting means from said engagement with said cabin floor when said backrest member is in said fold-flat configuration.

6. A stowable vehicle seat assembly according to claim 5, further comprising backrest locking means for locking said backrest member in said substantially parallel juxtaposed relation with said seat cushion member when said mounting means is released from said engagement with said cabin floor as aforesaid.

7. A stowable vehicle seat assembly according to claim 6, further comprising seat biasing means for biasing said seat cushion member towards said raised stowed configuration.

8. A stowable vehicle seat assembly according to claim 7, wherein said control rod system comprises a forward control rod and a rearward control rod, with said forward control rod and said rearward control rod each being pivotably interconnected between said cabin floor and said seat cushion member, such that said forward control rod, said rearward control rod, said cabin floor and said seat cushion member together define a notional quadrilateral having four pivotal corners.

9. A stowable vehicle seat assembly according to claim 8, wherein said mounting means comprises one; or more releasable front locking hooks pivotably mounted one each on each of said front legs, and one or more releasable rear locking hooks pivotably mounted one each on each of said rear legs, such that, when said backrest member is in said fold-flat configuration, said front locking hooks and said rear locking hooks are pivotable between:
   a) a closed configuration whereat each of said front locking hooks and said rear locking hooks is adapted for secure releasable engagement with a respective striker pin defined within said cabin floor; and
   b) an open configuration whereat each of said front locking hooks and said rear locking hooks is adapted to release said respective striker pin.

10. A stowable vehicle seat assembly according to claim 9, wherein said mounting means further comprises a hook link member operatively interconnected between said front locking hooks and said rear locking hooks to cause positive pivoting of said front locking hooks in unison with said rear locking hooks during pivoting between said closed configuration and said open configuration as aforesaid.

11. A stowable vehicle seat assembly according to claim 10, wherein said front locking hooks and said rear locking hooks are biased towards said closed configuration.

12. A stowable vehicle seat assembly according to claim 11, wherein said mounting means further comprises a manually grippable handle means rotatably mounted on said seat cushion member and operatively connected to said front locking hooks, for selectively pivoting said front locking hooks together with said rear locking hooks from said closed configuration towards said open configuration as aforesaid.

13. A stowable vehicle seat assembly according to claim 12, wherein said leg locking means comprises a backrest link member pivotally connected to said backrest member, and a hook pawl member pivotally connected to said backrest link member, with said backrest link member and said hook pawl member together being adapted for positive pivoting in unison with said backrest member between:
  a) said deployed design configuration, whereat said hook pawl member engages one of said rear locking hooks in obstructed relation so as to prevent pivoting of said one of said rear locking hooks from said closed configuration towards said open configuration; and
  b) said fold-flat configuration, whereat said hook pawl member is removed from said engagement with said one of said rear locking hooks, in unobstructed relation, so as to enable pivoting of said one of said rear locking hooks from said closed configuration towards said open configuration as aforesaid.

14. A stowable vehicle seat assembly according to claim 13, wherein said backrest locking means comprises a backrest cam member pivotally connected substantially adjacent to one of said rear legs, and a backrest cam biasing means for pivotally urging said backrest cam member from:
  a) a striker pin engaging position, whereat said backrest cam member engages said respective striker pin and said mounting means engages said cabin floor as aforesaid, with said striker pin engaging position of said backrest cam member being adapted to enable selective pivoting of said backrest member between said deployed design configuration and said fold-flat configuration as aforesaid; towards
  b) a backrest engaging position, whereat said mounting means is released from said engagement with said cabin floor as aforesaid, and whereat said backrest cam member is removed from said engagement with said respective striker pin into operative obstructing engagement with said hook pawl member, so as to lock said backrest member in said substantially parallel juxtaposed relation with said seat cushion member as aforesaid.

15. A stowable vehicle seat assembly according to claim 14, wherein said seat biasing means comprises a torsion rod pivotably interconnected between said cabin floor and said control rod system.

16. A stowable vehicle seat assembly according to claim 15, wherein said torsion rod is pivotably interconnected between said cabin floor and said rearward control rod.

17. A stowable vehicle seat assembly according to claim 16, further comprising a stowed latching means for releasably securing said vehicle seat assembly in said raised stowed configuration.

* * * * *